UNITED STATES PATENT OFFICE.

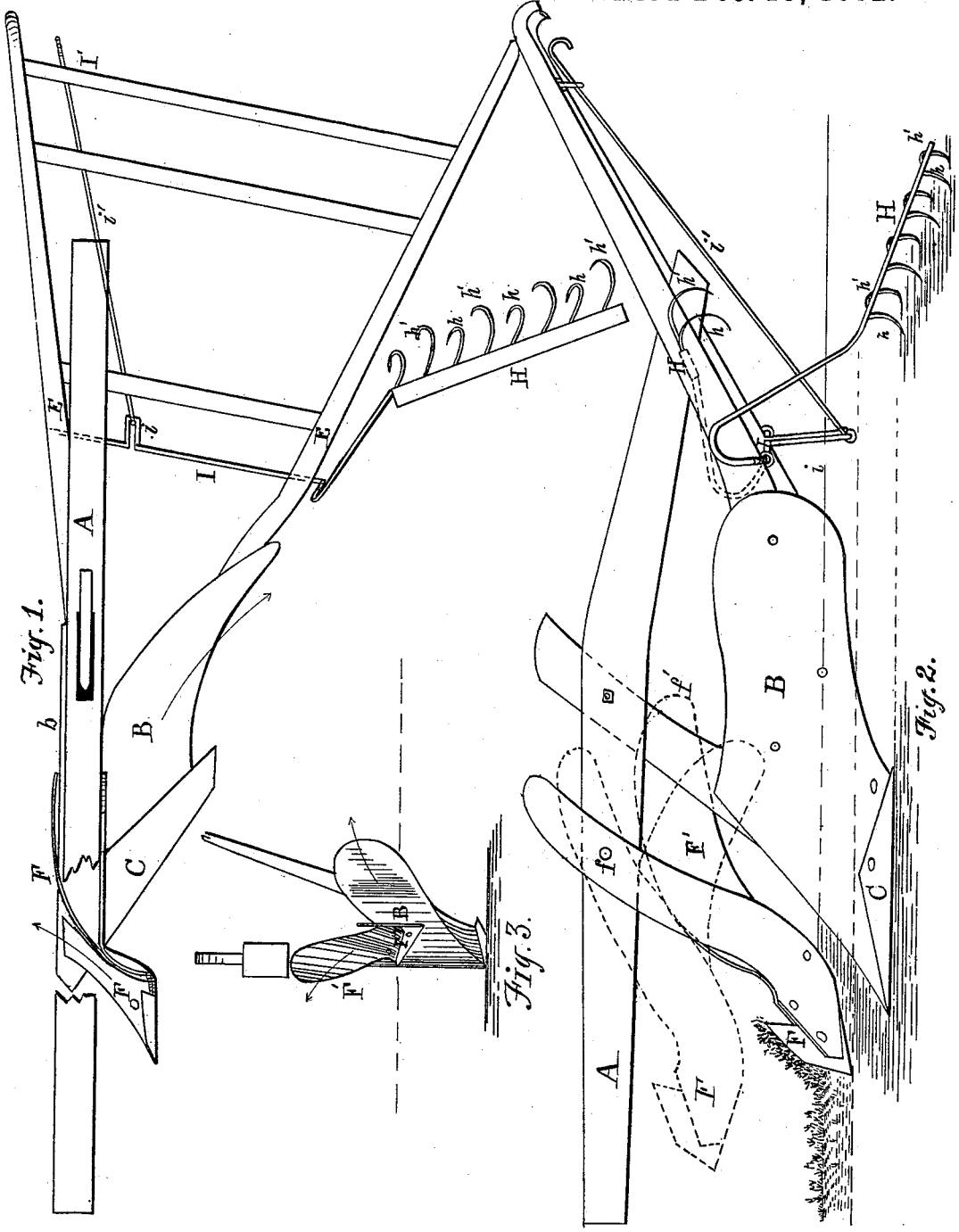

LEROY S. PFOUTS, OF WILMOT, OHIO.

PLOW.

SPECIFICATION forming part of Letters Patent No. 269,457, dated December 19, 1882.

Application filed April 6, 1882. (Model.)

*To all whom it may concern:*

Be it known that I, LEROY S. PFOUTS, a citizen of Wilmot, residing at Wilmot, in the county of Stark and State of Ohio, have invented certain new and useful Improvements in Plows, of which the following is a specification, reference being had therein to the accompanying drawings.

This invention relates to certain improvements in plows; and it consists, first, in the arrangement of a jointer or sod-cutter with its landside reverse to the land side of the plow, and having the mold-board long enough to pass beyond the standard of the plow, so that the sod, when cut and turned by the mold-board, will fall over near the rear end of the landside of the plow, and if it does not then fall into the furrow just made it will be turned under by the next cut of the plow.

It also consists in attaching to the plow a rake upon a flexible rod and crank-shaft running across between the arms, and having a connecting-rod to be operated by the driver, so that the rake may be lifted clear from the ground, all of which will be more particularly hereinafter described, and set forth in the claims.

Figure 1 is a top view of the plow with the improvements attached. Fig. 2 is a side elevation of the same. Fig. 3 is an end elevation of the same.

A is the plow-beam; B, mold-board; C, share; D, the standard; E E, the handles with braces, all made in the ordinary manner. F is the share; F', the mold-board of a jointer, attached to the plow-beam at $f$ by a pivot and tightening-bolt, so that the position of the jointer can be adjusted to suit the circumstances of the work to be done. This mold-board is placed contrariwise to the mold-board of the plow, so that in a right-hand plow the sod or turf cut by the jointer will be turned to the land side of the plow, and vice versa. The mold-board of the jointer is made long enough to pass to the rear of the standard at $f'$, so as to drop the sod so far to the rear that it will fall behind the landside and into or very near the fresh-cut furrow of the plow; and if it does not fall immediately into the furrow the next cut will inevitably turn it into the furrow and be covered by the board-mold of the plow. When not required to be used, the jointer can be put up to the position shown in broken lines, and by the bolt at $f$ the jointer can be adjusted to any height required.

Attached to the handles of the plow is a rake, H, with curved teeth $h\ h'$. A shaft, I, extends through the handles, or underneath, in suitable bearings. On the end of shaft I is a flexible rod so curved as to have the rake H rest horizontally on the ground, but at a considerable angle with line of draft. On shaft I is a crank, $i$, to which is attached a connecting-rod, $i'$, which is supported under the cross-rod I', near the ends of the plow-handles, so that the driver can reach it with his hand to lift the rake whenever it may be requisite. The teeth $h\ h\ h$, &c., are arranged in advance of the teeth $h'\ h'\ h'$ to permit clods too large for the spaces to fall out of the way sidewise.

I claim—

1. In combination with a plow, a jointer having its mold-board turned in a contrary direction to the plow mold-board and extended beyond the standard so far that the turf will be dropped in or near the furrow in rear of the plow, substantially as and for the purpose described.

2. The combination, with a plow, of the rake H, having a flexible shank bent to form a vertical section swiveled to the plow, and provided with a crank-shaft and an adjusting rod or handle, substantially as and for the purpose described.

In testimony whereof I affix my signature in presence of two witnesses.

LEROY S. PFOUTS.

Witnesses:
J. J. DEAL,
P. R. AKEY.